(12) United States Patent
Heddebaut et al.

(10) Patent No.: US 7,725,252 B2
(45) Date of Patent: May 25, 2010

(54) DEVICE AND METHOD FOR POSITIONING AND CONTROLLING RAILWAY VEHICLES WITH ULTRA-LARGE BANDWIDTH

(75) Inventors: Marc Heddebaut, Sainghin en Melantois (FR); Alika Rivenq-Menhaj, Artres (FR); Jean-Michel Rouvaen, Marly (FR); Fouzia Elbahhar, Aulnoy-lez-Valenciennes (FR); Jean-Pierre Ghys, Sameon (FR)

(73) Assignees: Institut National de Recherche sur les Transports et leur Securite (INRETS), Arcueil (FR); Centre National de la Recherche Scientifique (CNRS), Paris (FR)

( * ) Notice: Subject to any disclaimer, the term of this patent is extended or adjusted under 35 U.S.C. 154(b) by 1053 days.

(21) Appl. No.: 10/564,836

(22) PCT Filed: Jul. 15, 2004

(86) PCT No.: PCT/FR2004/050336

§ 371 (c)(1),
(2), (4) Date: Mar. 8, 2006

(87) PCT Pub. No.: WO2005/007482

PCT Pub. Date: Jan. 27, 2005

(65) Prior Publication Data

US 2006/0151672 A1 Jul. 13, 2006

(30) Foreign Application Priority Data

Jul. 16, 2003 (FR) .................................. 03 50336

(51) Int. Cl.
*G01C 21/00* (2006.01)

(52) U.S. Cl. ............................ 701/207; 701/19; 701/20; 246/3; 246/121

(58) Field of Classification Search ..................... 701/1, 701/19, 20, 36, 207; 246/3, 121, 122 R; 455/39, 73, 113, 524
See application file for complete search history.

(56) References Cited

U.S. PATENT DOCUMENTS

| 4,873,531 | A | * | 10/1989 | Heddebaut et al. | .......... 343/711 |
| 5,366,183 | A | | 11/1994 | Gill | |
| 5,420,883 | A | | 5/1995 | Himes et al. | |

FOREIGN PATENT DOCUMENTS

| DE | 43 36 799 | 5/1995 |
| DE | 199 07 466 | 11/2000 |
| EP | 0 341 826 | 11/1989 |

* cited by examiner

*Primary Examiner*—Gertrude Arthur Jeanglaud
(74) *Attorney, Agent, or Firm*—Young & Thompson

(57) ABSTRACT

A device and method for positioning and controlling railway vehicles. The device includes fixed stations (1) including first elements for transmitting/receiving (2) signals and a central control station (3) to which the fixed stations (1) are connected. Each railway vehicle (4) includes second elements for transmitting/receiving (6) signals. The signals transmitted by the first and second transmitting/receiving elements (2, 6) including an identifier specific to the transmitter and at least one message and consist in non-sinusoidal radio signals with very large bandwidth whose spectrum ranges between 1 and 10 GHz. Each railway vehicle (4) and each fixed station (1) include processing elements (8) for determining the identifier and the at least one message of each received signal. The central control station (3) sends command control instructions.

17 Claims, 1 Drawing Sheet

DEVICE AND METHOD FOR POSITIONING AND CONTROLLING RAILWAY VEHICLES WITH ULTRA-LARGE BANDWIDTH

BACKCROUND OF THE INVENTION

For planning large urban agglomerations whereof the population has grown very rapidly during the XXth century, the underground rail way remains the ideal solution for public transports. These lanes which are at least partially underground meet indeed the recent requirement of clearing the centre of agglomerations from any vehicle and of turning said town centre into pedestrian precincts while running through said agglomerations radially and proving therefore more efficient than the circular roads. However, improving the quality of service or the safety feeling of the passengers transported by fully automated urban railway transport system requires lots of efforts in numerous fields.

It requires first of all permanent ground-rail vehicle communication and a large capacity of transmission to meet, in addition to the basic requirements regarding information exchange between on-board and ground automated systems, nascent needs such as video camera surveillance of the inside of the vehicle for ensuring safety of passengers or the transmission of high throughput communications intended for passengers, such as multimode information or multimedia services.

The average distance tends to increase between the stations of urban railway lines relative to the older network. This distance which is approximately 500 m on the older underground Parisian network has, for instance, been increased to 2000 m on the automated line, "Météor", built in 1998. This extension of the interval between the stations, which depends on the planning of the towns to be supplied, enables to increase the commercial speed of the transport trains to reach speeds close to 50 km/h whereas they are only about 25 km/h on the former networks. This gain in speed does not only aim at reducing the average travel time for the user, but should also enable sufficient flow of passengers to meet the so-called rush hours.

This increase in the average distance between stations is added a concern which is to facilitate more and more the maintenance of the lines while arranging only a very small number of elements on the ground, on the lane or between the stations such as communication media, beacon . . . Failing any communication media (cable, radiating guide . . . ), free propagation radio technology is therefore used.

All the current driving systems in operation use sinewave signals based upon narrow band or spectrum-spreading technologies. Items of radio equipment are hence preferably installed far and between in station.

However, when considering the propagation of sinewave radioelectric signals through a tunnel, at low frequency, i.e. just a few hundred MHz, these signals are attenuated very rapidly. Attenuation may reach values of the order of 30 to 40 dB per 100 m at 100 MHz through a road tunnel. Such physical characteristic renders thereof the use thereof incompatible with the ranges between stations currently contemplated in modern urban guided transport (of the order of one kilometer).

OBJECT OF THE INVENTION

The purpose of the present invention is hence to provide a device and a method for positioning and controlling rail vehicles with ultra wide frequency bands simple in their design and in their operating mode, with very high transfer rate of data and economical, limiting the risks of interferences with other wireless communication systems, thereby enabling rail vehicle-ground telecommunication with a radio-electric coverage, in particular in tunnel, close to 100% and highly available, very reliable hodometry of the rail vehicle and a perception of the front environment of said vehicle for the detection of obstacles and hence reinforced safety of the passengers. Such system also enables direct communication between vehicles, which proved necessary in certain operating modes.

SUMMAIRY OF THE INVENTION

To this end, the invention relates to a device for positioning and controlling rail vehicles including fixed stations comprising first transmission-reception means of signals and a central control station to which are connected the fixed stations and controlling a transport zone.

According to the invention,
- each rail vehicle comprises second transmission-reception means of signals containing a specific identifier of the transmitter and at least one message,
- the signals transmitted by the first transmission-reception means fixed stations contain a specific identifier of the transmitter and at least one message,
- the central control station sends rail operation control orders,
- each rail vehicle and each fixed station include processing means for determining the identifier and at least said message of each signal received,
- the signals of the first and second transmission-reception means are non-sinewave radio signals with a very large passband whereof the frequency spectrum ranges between 1 and 10 GHz.

By "rail vehicle" is meant here any guided transport system, regardless whether the guiding system is operated by railways, longitudinal sleepers or any other means.

In different particular embodiments of the device for positioning and controlling rail vehicles, each having its own advantages and liable to numerous technically possible combinations:
- each rail vehicle includes on the one hand, means for determining the position and the direction of said vehicle in the transport zone and, on the other hand, means for determining an actual speed measurement of said vehicle, said means receiving signals from the processing means,
- each rail vehicle includes means for detecting passive obstacles or other vehicles on the lanes receiving signals from said processing means,
- the localisation in the transport zone, the speed and the direction of each rail vehicle are determined on the one hand, and the detection of obstacles is realised on the other hand, in real time and simultaneously,
- said specific identifier is obtained by pseudo-random encoding,
- the rail operation control orders transmitted by the central station include navigation instructions of at least one rail vehicle,
- said orders comprise a communication for said rail vehicle,
- the central control station includes a processing unit for centralising and processing the data sent by the fixed stations and means for displaying said data on a screen in real time.

The invention also concerns a method for positioning and controlling rail vehicles including fixed stations comprising first transmission-reception means of signals and a central control station to which are connected the fixed stations.

According to the invention,
- each rail vehicle comprises second transmission-reception means of signals,
- a specific identifier is determined for each of the first and second transmission-reception means, said signals being non-sinewave radio signals with a very large passband whereof the frequency spectrum ranges between 1 and 10 GHz containing said identifier and at least one message,
- for each of the signals received by the fixed station and by each rail vehicle, the identifier and at least said message of this signal are determined by processing means,
- rail operation control orders are sent by the central control station.

In different embodiments, the present invention also concerns the following characteristics which should be considered individually or according to all their technically possible combinations:
- the transport zone controlled by the central station and wherein the rail vehicles are displaced, is divided into a grid of points defined by the repetition of a same elementary mesh of length D,
- the length D of the elementary mesh is set typically to a few hundred meters,
- rail operation control orders are sent by the central control station to each rail vehicle so that a single vehicle is included any time over the length D,
- rail operation control orders are sent by the central control station to at least two rail vehicles to conduct a rendezvous manoeuvre over the length D,
- the length D of the elementary mesh is variable with time,
- the length D of the elementary mesh is determined in real time from the signals transmitted by each rail vehicle, said length being at least equal to the safety distance $D_{min}$ between each vehicle, the central station sending rail operation control orders to each rail vehicle for keeping said distance D between each vehicle,
- passive obstacles on the lanes are determined by the second transmission-reception means and for each rail vehicle in motion.

The device and the method for controlling and positioning as described previously may be used advantageously for automated underground transport trains.

BRIEF DESCRIPTION OF THE DRAWINGS

The invention will be described more in detail with reference to the appended drawings wherein.

DETAILED DESCRIPTION OF THE INVENTION

Figure 1:
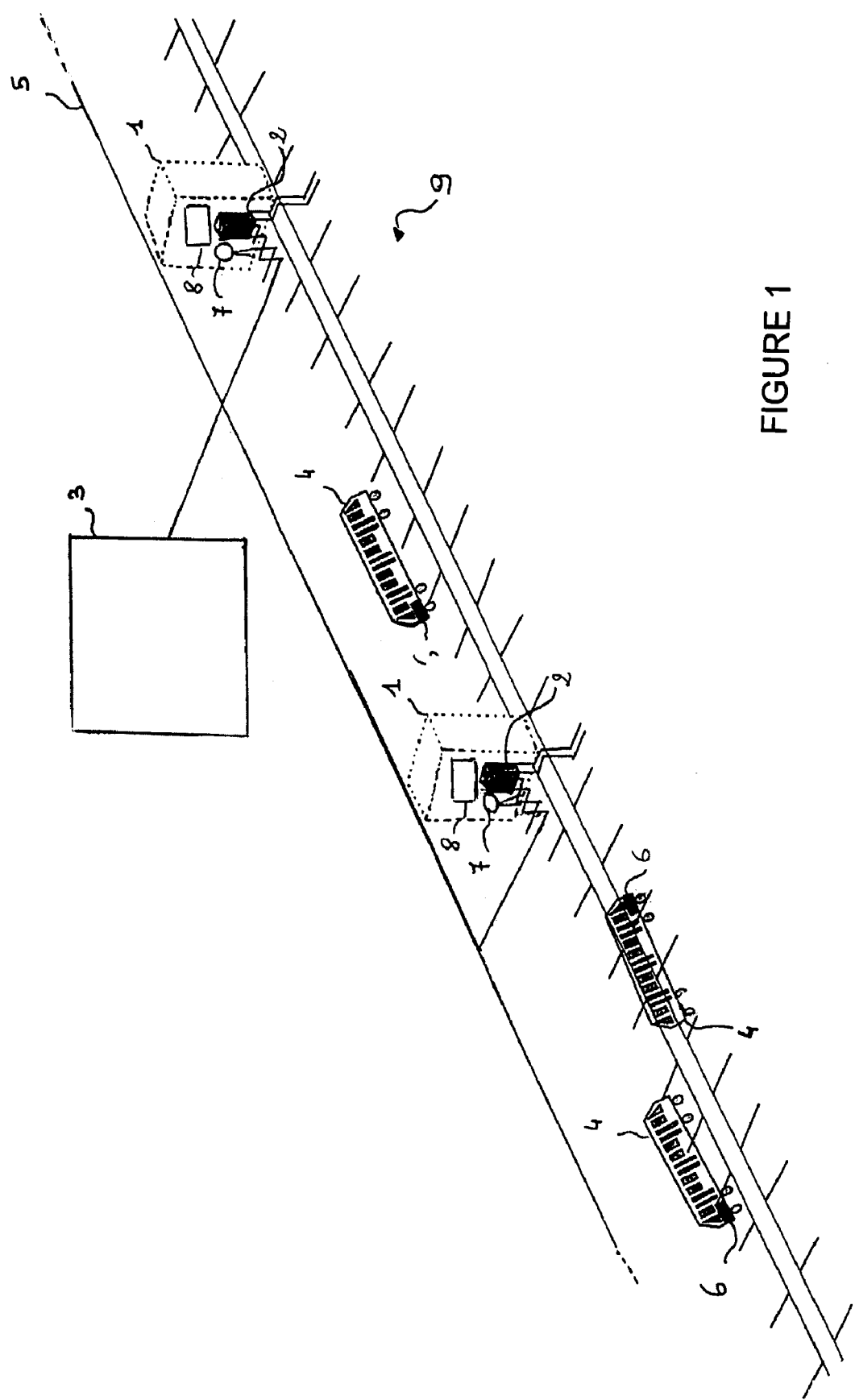
FIG. 1 is schematic representation of the device for positioning and controlling rail vehicles according to an embodiment of the invention.

FIG. 1 shows a device for positioning and controlling rail vehicles according to a particular embodiment of the invention. This device includes fixed stations 1 comprising first transmission-reception means 2 of signals. It also includes a central control station 3 controlling a transport zone and to which are connected the fixed stations 1. This central control station 3 sends rail operation control orders. In a preferred embodiment, such orders include navigation instructions for at least one rail vehicle 4 localised in the transport zone controlled by said central station 3. Such orders may comprise moreover a communication intended for the passengers on-board said rail vehicle 4 such as traffic information, messages multimedia, etc.

The ground information processed by the fixed stations 1 may be aggregated among al the fixed stations 1 by a point-to-point link 5 for instance by optic fibre so that the central control station 3 knows comprehensively the speeds, positions and states of al the rail vehicles 4 in circulation on a line or over the whole transport zone.

The central control station 3 may comprise a processing unit for centralising and processing the data sent by the fixed stations and means for displaying said data on a screen in real time.

Each rail vehicle 4 comprises second transmission-reception means 6 of signals. The signals transmitted by the first and second transmission-reception means of signals 2, 6 contain a specific identifier of the transmitter and at least one message. Indeed, along an urban guided transport line, there are a finite number of stations and hence of fixed stations 1 associated with each of these stations, of the order of a few tens. There are also a finite number of rail vehicles 4 moving in the transport zone controlled by the central control station 3. Each fixed station 1, and hence each station, and each rail vehicle 4 may therefore be ascribed a single identifier like the PRN codes PRN of the GPS satellites (Global positioning system).

By "identifier" is meant here a specific code and a specific identity which are ascribed to a transmitter. These identifiers are known by the whole transport network but not divulged to the outside since such elements are kept confidential to improve the stealthiness of the communications and thereby increase global safety of the transport system of transport. These single identifiers per rail vehicle 4 and fixed station 1 modulate a pulse string according to an ultra wide band technique. In radio communication, the gap between successive pulses may, indeed be kept constant or varied by a piece of information, a code or both at the same time. Preferably, said specific identifier is obtained by pseudo-random encoding.

A single radio transmission channel is available typically in a tunnel. To provide the control-command device, several rail vehicles or fixed stations, should be able to access simultaneously said radio channel. Like the constellation of GPS satellites, all transmitting over the same channel in band L, to each rail vehicle element or to each fixed communication station of the transport network is associated a particular code derived from a family (for example family of the Gold codes in the case of GPS satellites or still codes derived from families with orthogonal functions). A property particularly sought-after in this family of codes lies in its orthogonality properties which enable a given receiver to discriminate the signals, codes in this field, with minimal interferences.

The signals of the first and second transmission-reception means 2, 6 are radio signals with a very large passband whereof the frequency spectrum ranges between 1 and 10 GHz. Indeed, for such high frequencies, the tunnel behaves like an oversized wave guide. From then on, for tunnel sections of tunnel of several hundred meters, the signals of frequencies 1 to 10 GHz are attenuated much less. There results that the transmission balances of these signals are compatible with a range of the order of one kilometer. These signals are hence perfected surrounded in the frequency range propagating efficiently in an underground tunnel. Besides, the wide spectrum spread of the signals processed as well as the very small elementary duration (of the order of a nanosecond) of an ultra wide band signal enable to dispense with difficult propagation conditions in tunnel characterised by numerous multiple paths linked with the reflections against the walls as well as to signal spreads which may be as high, in tunnel, as several ten nanoseconds. The ultra wide band technology enables therefore optimal radioelectric coverage necessary to an automated driving system of rail vehicles such as an automated underground train.

The first and second transmission-reception means 2, 6 comprise for instance a wide band aerial 7. Such aerial 7 may be, when a little directive radiation is requested, on-board for instance, a circular disk type monopole or a dipole formed of two circular disks. Such arrangement, among many other solutions with wide band aerials, enables to provide the requested passband 1 to 10 GHz for disk diameters smaller than some ten centimeters. Such aerials 7 may also be placed, for instance in station for fixed stations 1, at the focus of a parabola or of a wide band focus element in order to increase the directivity and hence the transmission balance of the ground-rail vehicle link. Each rail vehicle 4 and each fixed station 1 include processing means 8 for determining the identifier and at least said message of each signal received. Thus, since the transmitter of each fixed station 1 or of each rail vehicle is ascribed a specific code and since the first and second transmission-reception means 2, 6 contain in a storage memory the identifiers of the different transmission-reception ultra wide band means of the network, each ultra wide band receiver, fixed or mobile, may play the part, locally, of these different identifiers and attempt at decoding by correlation the signals from the first transmission-reception means 2 of the fixed stations 1 (stations) or from the second transmission-reception means 6 coming from the rail vehicles 4, such as radioelectric range trains. Each transmission-reception means 2, 6 has therefore:

One or several processing lanes locked onto the codes of the fixed stations 1 (stations) and rail vehicles 4 (trains) in radio range. They collect the operating data transmitted (identity, speeds, positions, state of the trains and stations . . . );

One lane or several processing lanes calculate the speeds relative to the fixed stations 1 or rail vehicles 4 with which the ultra wide band communication is established;

One lane calculates the distance between stations in order to determine the position of the train 4 between two identified intermediate stations of the transport zone;

One lane scans for the appearance of new rail vehicles 4 or fixed stations 1 in the radio coverage zone while generating locally all the vehicle codes 4 and fixed stations 1 and attempting to detected by correlation a new useful signal.

Each fixed station 1 may hence known the pieces of basic information relative to the rail vehicles 4 circulating in its coverage zone 9. It is possible on the ground to measure remotely the speeds and positions of said rail vehicles 4 or still to receive such pieces of information prepared on-board the rail vehicle 4 on the base of the analysis of the ultra wide band signals exchanged between the ground and the vehicles 4.

All the rail vehicles 4 may calculate their distances to the downstream and upstream fixed stations where they are situated locally. The vehicles 4 may also acquire pieces of information regarding the identity, the speed and the position relative to the other vehicles 4 in the vicinity.

This positioning and controlling device enables accurate train hodometry. It includes precise localisation of the rail vehicles 4 (trains . . . ) in the transport zone capable of authorising for exemplification purposes <<goal shoot>>, i.e. the capacity of managing automatically the stoppage of rail vehicles 4 accurately before landing gates or still the entrance into a particular lane zone of a few hundred meters called block section. As a first approximation, the rail vehicles 4 move following a single dimension along the lanes. Measuring the distance relative to a fixed reference upstream and/or downstream as based on the flight time of signals derived from pieces of geolocalised equipment and situated in upstream/downstream stations determines, with high degree of certainty and accuracy, the absolute position of the guided mobile. While considering again the order of magnitude of the duration of an ultra wide band elementary pulse, of the order of the nanosecond regardless of the wave shape employed, this duration corresponds to a distance travelled through the air of approximately 30 cm. A distance resolution equal to a fraction of this length may be obtained by processing the signal. This leads to a distance resolution of the order of several centimeters, which is compatible notably with the target shooting objective for an accurate stoppage before a landing gate of a rail vehicle 4. The ultra wide band technology also enables to reach, notably by deriving from this distance, an <<(actual speed measurement of the rail vehicle>>, realised without detriment to the cinematic capacities of the vehicles (no un-braked axle . . . ) and highly performing, including for low speeds (zero speed detection-vehicle stoppage).

Each rail vehicle 4 also includes means for detecting passive obstacles on the lanes by the perception of the front environment of the vehicle by means of an ultra wide band radar technology. A lane locked on the incident code transmitted by the second transmission-reception means endeavours to detect passive obstacles in lane. Such surveillance authorises the detection of obstacles (objects left on the lane during night-time works, stone falls from a tunnel vault . . . ) or of other vehicles and enables to react on the speed programme of the train (emergency braking for instance in case of unexpected obstacle). In the latter case, such surveillance function enables to operate the transport system according to particular modes such as docking the vehicles after breakdown or operating a line in dividable trains having, for example, a maximum of running elements in the centre of the line and a minimum at the ends.

The invention also concerns a method for positioning and controlling rail vehicles 4 including fixed stations 1 comprising first transmission-reception means 2 of signals and a central control station 3 to which are connected the fixed stations 1. Each rail vehicle 4 comprises second transmission-reception means of signals 6.

According to such method, a specific identifier is determined for each of the first and second transmission-reception means 2, 6, said signals being non-sinewave radio signals with a very large passband whereof the frequency spectrum ranges between 1 and 10 GHz containing said identifier and at least one message. For each of the signals received by the fixed station 1 and by each rail vehicle 4, the identifier and at least said message of this signal are determined by processing means. Rail operation control orders are sent by the central control station.

A railway line operation is performed according to two possible operating modes. For both modes, the transport zone controlled by the central station 3 and wherein the rail vehicles 4 are displaced, is divided into a grid of points defined by the repetition of a same elementary mesh of length D.

The length D of the elementary mesh may be set typically to several hundred meters and the system then switches to so-called mode with fixed block sections. Rail operation control orders are then sent by the central control station 3 to each rail vehicle 4 so that a single vehicle is included any time over the length D. This operating mode in fixed blocks is the most common operating mode. The underground line, a few kilometer long, is divided materially into a series of fixed length blocks. The automatic driving system processes the pieces of information derived from trains and the ground (speed, position, block inlet and occupancy detectors) in order to implement all possible means so that a single train occupies, at any time, a block. For exemplification purpose, the fixed and on-board automatisms will dialogue, prepare and manage the stoppage, at the borderline of the upstream block, of a train attempting to enter a downstream block occupied by another train.

The length D of the elementary mesh may also be variable with time and it is then a so-called deformable moving block mode. The length D of the elementary mesh is determined in real time from the signals transmitted by each rail vehicle 4, said length being at least equal to the safety distance $D_{min}$ between each vehicle, the central station 3 sending rail operation control orders to each rail vehicle 4 for keeping said distance D between each vehicle. In this second operating mode, the railway line is not limited any longer in immovable blocks, but a central control station 3 receives the speed and position information from each of the rail vehicles 4 on the line. It calculates permanently safety interval before each of the trains enabling said trains to stop in safety mode if needed. According to the cinematic capacities of the trains (speed, braking capacities, adhesion), this distance evolves rapidly. These pieces of information are refreshed permanently on the basis of the speeds and positions transmitted periodically by all the trains. The ground system calculates and sends in return, to each of the trains of the line, valid speed and itinerary authorisations for a limited time period (a few hundred milliseconds). This operating mode enables in theory to process a maximum of trains on the line and hence to optimise the transport resource.

Thanks to the direct communication between vehicles, such calculation may also take place on-board trains without resorting to fixed technical means, on the ground. The line is managed directly from the trains, whereas the ground system fulfils a supervising role only.

A mixed operating mode exists however. When a train breaks down or, on certain lines operated as dividable trains, rendezvous manoeuvres should take place so that a train may push, when not in operating mode, the train broken down or become coupled with an extent train in order to provide for instance in the central zone of a particularly loaded line, an additional transport capacity. In both cases, a train enters a block occupied and the system must manage the safety of such operation which therefore proves contrary to the basic operating principle of a line with fixed blocks.

The device and the method for positioning and controlling rail vehicles 4, according to the invention, may advantageously be implemented to fulfil one or several of the following functions:

i) Ground-rail vehicle communication 4, ii) Direct communication between rail vehicles 4, iii) Precise localisation of the rail vehicles 4 (trains . . . ) in the transport zone controlled by the central control station 3, iv) <<actual speed measurement of the rail vehicle>>, realised without detriment to the cinematic capacities of the vehicles (no un-braked axle . . . ) and highly performing, including for low speeds (zero speed detection-vehicle stoppage), v) surveillance for passive obstacles or other vehicles on the lanes by the perception of the front environment of the vehicle by means of an ultra wide band radar technology.

The invention claimed is:

1. A device for positioning and controlling rail vehicles (4) comprising:
    fixed stations (1) comprising a first signal transmitter and receiver (2); and
    a central control station (3) to which are connected the fixed stations (1) and controlling a transport zone,
    wherein,
    each rail vehicle (4) comprises second signal transmitter and receiver (6) containing a specific identifier of a transmitter and at least one message,
    the signals transmitted by the first transmitter and receiver (2) of the fixed stations (1) contain a specific identifier of the transmitter and at least one message,
    the central control station (3) sends rail operation control orders,
    each rail vehicle (4) and each fixed station (1) include processor (8) for determining the identifier and at least said message of each signal received,
    the signals of the first and second transmitter and receiver (2, 6) are non-sinewave radio signals with a very large passband whereof a frequency spectrum ranges between 1 and 10 GHz.

2. The device according to claim 1, wherein each rail vehicle (4) comprising:
    a first processing lane of the first and second transmitter and receiver (2, 6) determines the position and the direction of said vehicle in the transport zone; and
    a second processing lane of the first and second transmitter and receiver (2, 6) determines an actual speed measurement of said vehicle, each of a first and second transmitter and receiver receives signals from the processor.

3. The device according to claim 1, wherein each rail vehicle (4) comprising:
    a third processing lane of the first and second transmitter and receiver (2, 6) determines passive obstacles or other vehicles on lanes receiving signals from said processor.

4. The device according to claim 1, wherein a localisation in the transport zone, a speed and direction of each rail vehicle (4) are determined on the one hand, and a detection of obstacles is realised on the other hand, in real time and simultaneously.

5. The device according to claim 1, wherein said specific identifier is obtained by pseudo-random encoding.

6. The device according to claim 1, wherein the rail operation control orders transmitted by the central station (3) include navigation instructions of at least one rail vehicle (4).

7. The device according to claim 6, wherein said orders comprise a communication for said rail vehicle (4).

8. The device according to claim 1, wherein the central control station (3) includes a processing unit for centralising and processing data sent by the fixed stations (1) and displaying said data on a screen in real time.

9. The device according to claim 2, wherein each rail vehicle (4) comprising:
    a fourth processing lane of the first and second transmitter and receiver (2, 6) determines passive obstacles or other vehicles on lanes receiving signals from said processor.

10. A method for positioning and controlling rail vehicles including fixed stations (1) comprising first signal transmitter and receiver (2) and a central control station (3) to which are connected the fixed stations (1), wherein, each rail vehicle (4) comprises a second signal transmitter and receiver (6), a specific identifier is determined for each of the first and second transmitter and receiver (2, 6), said signals being non-sinewave radio signals with a very large passband whereof a frequency spectrum ranges between 1 and 10 GHz containing said identifier and at least one message, for each of the signals received by the fixed station (1) and by each rail vehicle (4) the identifier and at least said message of this signal are determined by processor (8), rail operation control orders are sent by the central control station (3).

11. The method according to claim 10, wherein a transport zone controlled by the central station (3) and wherein the rail vehicles (4) are displaced, is divided into a grid of points defined by the repetition of a same elementary mesh of length D.

12. The method according to claim 11, wherein the length D of the elementary mesh is set typically to several hundred meters.

13. The method according to claim 12, wherein rail operation control orders are sent by the central control station (3) to each rail vehicle (4) so that a single vehicle (4) is included any time over the length D.

14. The method according to claim 12, wherein rail operation control orders are sent by the central control station (3) to at least two rail vehicles to conduct a rendezvous manoeuvre over the length D.

15. The method according to claim 11, wherein the length D of the elementary mesh is variable with time.

16. The method according to claim 15 wherein the length D of the elementary mesh is determined in real time from the signals transmitted by each rail vehicle (4), said length being at least equal to the safety distance $D_{min}$ between each vehicle, the central station (3) sending rail operation control orders to each rail vehicle (4) for keeping said distance D between each vehicle.

17. The method according to claim 10 wherein passive obstacles on lanes are determined by the second transmitter and receiver (6) and for each rail vehicle (4) in motion.

* * * * *